Sept. 8, 1959

C. C. ROE 2,903,641

ALTERNATOR

Filed March 22, 1957

INVENTOR:
CHARLES C. ROE
BY
John F. Schmidt
ATTORNEY

Sept. 8, 1959 C. C. ROE 2,903,641
ALTERNATOR
Filed March 22, 1957 3 Sheets-Sheet 2
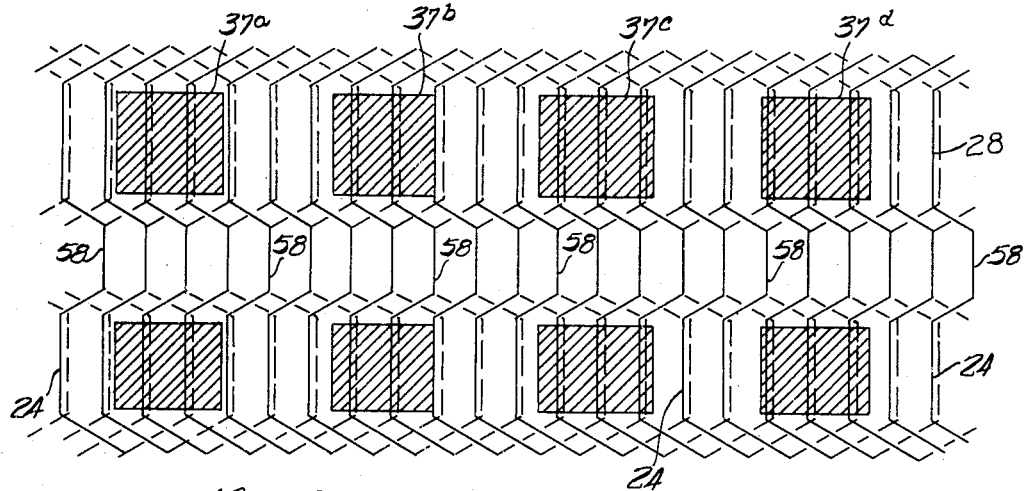
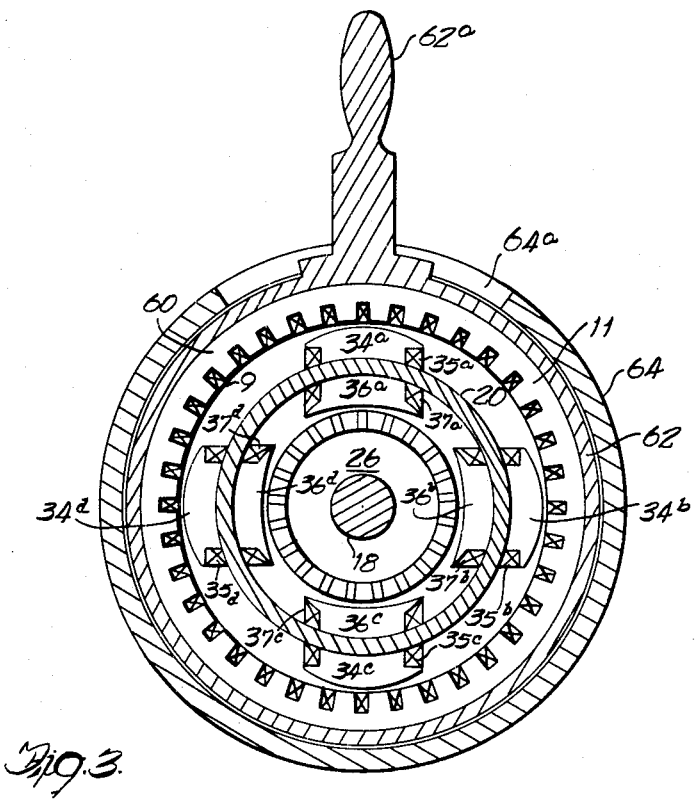
INVENTOR:
CHARLES C. ROE
BY
John F. Schmidt
ATTORNEY Sept. 8, 1959  C. C. ROE  2,903,641
ALTERNATOR Filed March 22, 1957  3 Sheets-Sheet 3

TO LOAD 16

INVENTOR:
CHARLES C. ROE
BY
John F. Schmidt
ATTORNEY

United States Patent Office 2,903,641
Patented Sept. 8, 1959

2,903,641
ALTERNATOR

Charles C. Roe, Longview, Tex., assignor to LeTourneau-Westinghouse Company, Peoria, Ill., a corporation of Illinois Application March 22, 1957, Serial No. 647,843

10 Claims. (Cl. 322—39)

My invention relates to an improved generator for alternating voltage in which frequency is controlled independently of prime mover speed and to a generating system using the generator.

In many applications of electric power it is desirable to provide a source of alternating voltage of frequency independent of prime mover speed. For example, in an earthmoving vehicle, the electric system may serve to assist the main mechanical drive, the electric generator being attached to the shaft of the main diesel drive engine and the electric drive motors being positioned to drive the rear wheels of the vehicle. When alternating current is used in systems of this kind many advantages are obtained, particularly the use of induction motors which have no commutators and thus are particularly suitable for the dusty conditions encountered in normal operation. The difficulty with such motors, however, is that they do not operate efficiently over wide speed ranges when energized by current of constant frequency. Rather, their efficient operation is attained when the motor is close to synchronous speed. Thus the most efficient application of these motors dictates the use of a variable frequency energizing current. Moreover, since the diesel engine forming the prime mover must be accelerated and decelerated in accordance with the overall demand for vehicle power, it is desirable to provide some way by which the frequency of the alternating current can be controlled independently of the prime mover speed.

In accordance with the present invention variable frequency current is achieved by the use of a unique generator and generating system. In brief, the structure includes a rotor connected to the shaft of the prime mover and having a main cylindrical magnetic part and an auxiliary cylindrical magnetic part. These are slotted and are wound with windings resembling the windings of conventional D.-C. motors and generators. The two sets of windings are interconnected. The stator includes a main polyphase armature winding which cooperates with the main rotor part to generate the output power in the form of polyphase alternating voltage. A pilot rotor in cooperation with the auxiliary rotor part has a plurality of magnet poles which—when rotated in relation to the rotor—serve to set up in the auxiliary rotor part of a rotating magnetic field which is reproduced in the main part of the rotor. This sets up in the main polyphase winding of the stator a like rotating magnetic field to generate power. The pilot rotor is itself rotated by an auxiliary polyphase stator winding which cooperates with magnet poles on the pilot rotor in synchronous machine action to rotate the pilot rotor in accord with the generated frequency. The two polyphase stator windings are connected together and to the load. The power angle between the voltages in the two polyphase stator windings is adjusted by mechanically shifting one winding in relation to the other. Since this power angle determines the driving power of the synchronous motor action driving the pilot rotor, the shifting action serves to fix the speed of rotation of the pilot rotor and thus control the output frequency of the complete machine.

In a variation of the machine above described, automatic frequency sensitive means is provided to shift one stator in relation to the other and thereby maintain a constant output frequency of value fixed by the control setting of the frequency sensitive means.

In the above described appartus the speed of the prime mover is not the frequency determining element. Rather, the frequency is controlled by the speed of the rotation of the pilot rotor and increases or decreases in accordance with variations of that speed of rotation.

It is therefore a general object of the present invention to provide an improved variable frequency alternating current generator in which the output frequency is independent of prime mover speed.

It is furthermore an object of the present invention to provide an improved generating system in which control of the frequency of the alternating generated voltage is automatically achieved through frequency-sensitive means.

Another object of the present invention is to provide a variable frequency generator in which the output frequency is controlled by a simple mechanical movement.

Still another object of the present invention is to provide an improved variable frequency generator in which two polyphase stators are used, one of which serves to feed back power to drive a pilot rotor, and in which the power thus fed back is controlled by shifting the power angle of one stator in relation to the other.

Still another object of the present invention is to provide an improved alternating current generator which provides variable frequency operation without the use of commutators.

Yet another object of the present invention is to provide an improved alternating current generator capable of producing variable frequency current which is simple in construction, reliable in operation, readily adapted to application on earthmoving vehicles for electric drive and other purposes, and is readily serviced and maintained.

It is yet another object of the present invention to provide an improved alternating generator of the variable frequency type in which a single field winding serves the double function of acting as a field for synchronous motor action of the pilot rotor and as a field for inducing voltage in the generator.

Still another object of the present invention is to provide an improved alternating curent generator of the variable frequency type utilizing a pilot rotor as the frequency determining element, and in which the alternating voltage itself serves to drive the pilot rotor at a speed determined by the frequency of the alternating voltage.

The novel features which I believe to be characteristic of my invention are set forth with particularity in the appended claims. My invention, itself, however, both as to its organization and method of operation, together with further objects and advantages thereof, will best be understood by reference to the following description taken in connection with the accompanying drawings in which:

Fig. 2 is a schematic circuit diagram in developed form of one form of windings provided in the rotor of the generator of Fig. 1;

Fig. 3 is a cross-sectional view through lines 3—3, Fig. 1;

Alternator

Figure 1:
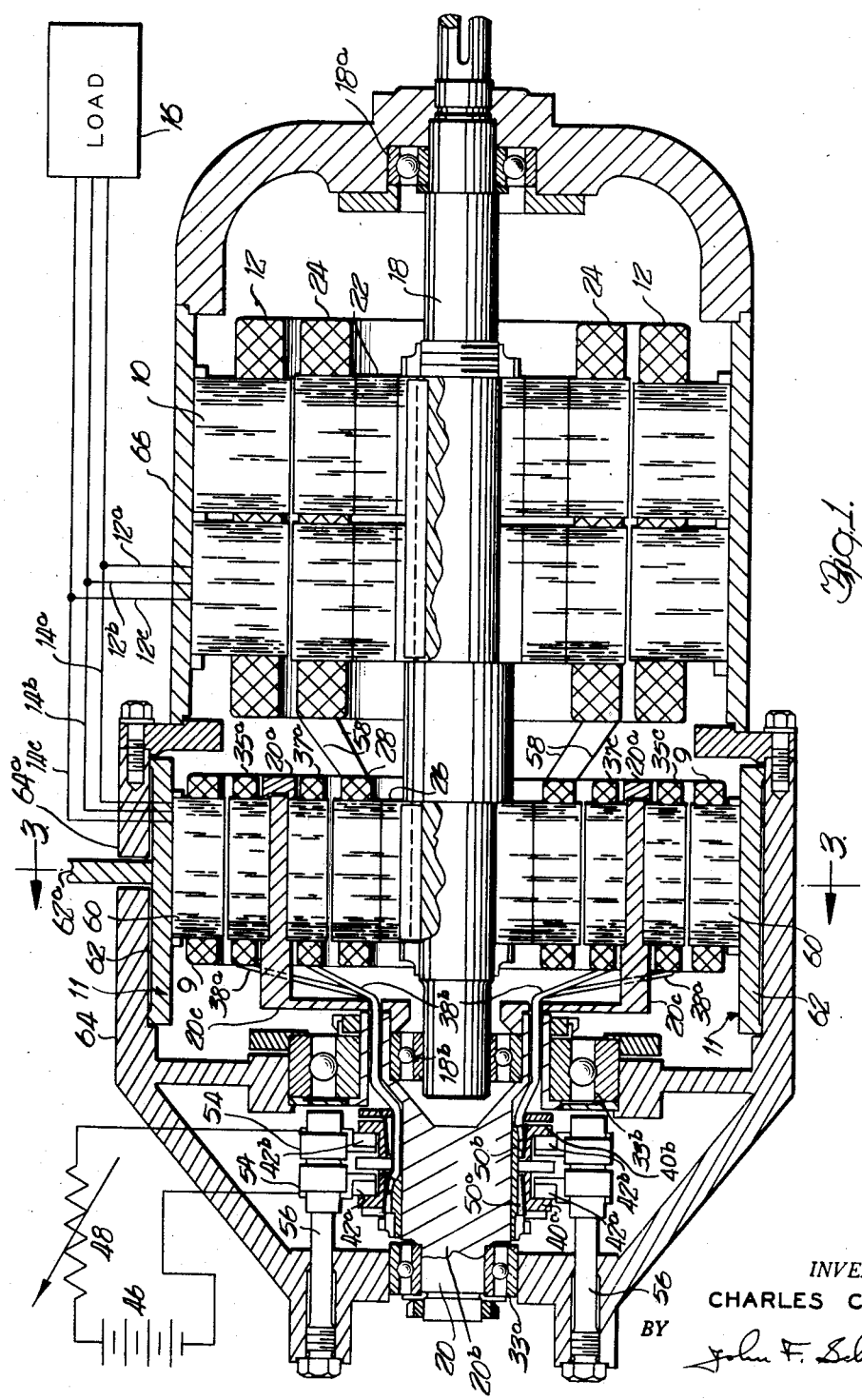
Fig. 1 is an axial cross-sectional view with parts in elevation showing a generator constructed in accordance with the present invention.

The alternator consists of a main three-phase stator indicated generally at 10 in electrical parallel relationship with the auxiliary three-phase stator indicated generally at 11. The winding 12 of stator 10 has three output conductors, 12a, 12b, and 12c which are electrically connected to the three-phase output conductors 14a, 14b, and 14c, respectively, of stator 11. The conductors 12a, 12b, and 12c and the conductors 14a, 14b, and 14c feed the load indicated generally at 16 which may, for example, be the electric assist drive motors of an earth-moving vehicle. Frequency control is accomplished by varying the mechanical phase position of the stator 11 in relation to that of stator 10, thus controlling the relative flow of power between stators 11 and 10, and load 16, and thereby controlling the output frequency as hereinafter described.

Construction

Referring now to Fig. 1, the main generator shaft is indicated at 18. This shaft is connected to a suitable prime mover (not shown), such as a diesel engine. As hereinafter described, the output frequency of the alternator may be controlled independently of the speed of rotation of shaft 18, although the shaft must be rotating at a speed within a predetermined range.

The shaft 18 of the main rotor is carried at the right hand end of the machine (as seen in Fig. 1) by the bearing 18a. At its left hand end as seen in Fig. 1, the shaft 18 is carried by bearing 18b. The outer race of bearing 18b is supported by the floating rotor indicated generally at 20. Two magnetic structures are carried by shaft 18. One such structure is indicated at 22 and forms the rotor of the main generating stator 12 as described hereafter. This unit is preferably formed from steel laminations which have longitudinal slots at their outer peripheries to receive winding 24 as hereinafter described in detail. The other unit on the shaft 18 is the rotor element 26 which is likewise formed of steel laminations with slots on their outer peripheries and carries the winding 28 which is received in these slots. The connections of the windings 24 and 28 are described hereinafter in detail.

The rotor elements 22 and 26 are in axial alignment and are co-extensive with the respective stators 10 and 11, as shown. The rotor elements 22 and 26 are affixed to shaft 18 by keys or other suitable means (not shown).

The floating rotor 20 has an annular portion 20a extending between the auxiliary rotor unit 26 and the auxiliary stator part 11 as shown. This rotor also has a disc-like portion 20c at its left hand end as seen in Fig. 1. Part 20a of the rotor 20 is in turn affixed to the shaft extension 20b, the latter being carried from the frame by bearings 33a and 33b.

The rotor 20 has four sets of inwardly and outwardly extending pole pieces. The outwardly extending pole pieces are indicated at 34a, 34b, 34c, and 34d, Fig. 3. These coact with the auxiliary stator 11 and are encircled by magnetizing windings 35a, 35b, 35c, and 35d, respectively. The inwardly extending pole pieces 36a, 36b, 36c, and 36d coact with the rotor unit 26 and similarly have magnetizing windings 37a, 37b, 37c, and 37d, respectively.

The windings 35a to 35d, inclusive, and 37a to 37d inclusive, are connected to be energized by current flow through the conductors 38a and 38b. These conductors are connected to the slip rings 40a and 40b, respectively, which in turn receive the brushes 42a and 42b, respectively. The source of unidirectional field voltage 46 is connected across the brushes 42a and 42b through the current controlling resistance 48.

The slip rings 40a and 40b are supported from the shaft 20 by the conical insulating sleeves 50a and 50b. The respective brushes 42a and 42b are biased against the annular faces formed by slip rings 40a and 40b by springs (not shown) which seat against the cup-shaped elements 54 which are supported by the pins 56 as shown.

Windings 24 and 28 on the rotor elements 22 and 26 are like conventional D.-C. rotor windings. In other words, the winding of the auxiliary rotor 26 is a continuous circumferential winding linking the fields of the pilot rotor poles 36a to 36d and current flow in the winding of main rotor part 22 gives rise to fields positioned like the fields of poles 36a to 36d. The number of slots on these respective rotor elements, the disposition in the slots, and the windings are the same in each. In the particular form shown in Fig. 2, the windings are of the simplex lap type in which the circuit may be traced from one point to another through a series of loops which progress around the periphery of the unit as shown. The left hand ends of the respective loops of winding 24 (as seen in Fig. 1) and the right hand ends of the loops of winding 28 (as seen in Fig. 1) are connected together by a series of conductors 58, Figs. 1 and 2. Since the respective windings are identical, it is possible to provide one connecting element for each of the loops of the respective windings as shown. Alternatively, wave type windings or other forms of D.-C. armature windings may be employed.

The auxiliary stator 11 is formed by a plurality of steel laminations 60 which are carried in the sleeve 62, Fig. 1. This sleeve is rotatably received inside of the sleeve portion 64 of the main frame of the machine so that the stator 11 may be rotated as desired in relation to the main frame. An elongated peripheral slot 64a is provided in the main frame 64 and receives the handle 62a by which the position of the stator 11 in relation to the frame of the machine may be manually adjusted. Stator 11 receives a conventional three-phase armature winding 9, wound with the same number of poles as there are outer poles on rotor 20, in this case four.

The main stator 10 is defined by a series of magnetic laminations which receive winding 12 as shown. These laminations are fixedly secured in the sleeve portion 66 of the main frame. Winding 12 is a conventional three-phase armature winding wound with the same number of poles as are produced by rotor winding 24.

Practical operation

The overall operation of the unit results from the action of stators 10 and 11 as parallel connected synchronous machines. As hereinafter described, operation of handle 62a varies the relative power flow between these machines and between each of them and the common load 16. This varies the speed of floating rotor 20 at which steady state operation occurs, and thereby controls the generating frequency.

The effect of the windings 24 and 28 is to produce in the main stator 10 a rotating magnetic field which rotates in unison with the poles 36a to 36d, inclusive—and hence in unison with the floating or pilot rotor 20. This action is due to the effect of poles 36a to 36d inducing voltages in the winding 28 in accord with the relative rotation of rotor 20 and rotor 26 and in accord with the direct current flow in windings 37a to 37d, inclusive. The resulting D.-C. voltages induced in winding 28 are applied across the turns of winding 24 and thereby cause current flow in that winding. The effect of this current flow is to produce a series of poles in the main rotor part 22 which rotates with respect to rotor part 20 in the same fashion as the poles 36a to 36d, inclusive, rotate in relation to auxiliary rotor part 26. Thus it will be seen that the action of rotors 22 and 26 is to reproduce within the main stator 10 a set of poles which rotate in unison with poles 36a to 36d; rotate in unison with the rotor 20; and of intensity determined by the current flow in windings 37a to 37d, inclusive. These poles within the stator 10 serve to induce three-phase voltages therein, appearing at conductors 12a, 12b, and 12c.

With respect to the stator 11, there is induced a three-phase voltage determined by the rotation of poles 34a to 34d, inclusive. This voltage is of a magnitude determined by the direct current flow in windings 35a to 35d, inclusive, and is of a frequency determined by the physical speed of rotation of the floating rotor 20. The terminal voltage developed by winding 9 leads or lags this induced voltage in accord with the direction and amount of the air gap power transfer between the floating rotor 20 and the stator 11.

From the above it will be apparent that the speed of rotation of floating rotor 20 fixes the frequency of the voltages induced in the stators 11 and 10, respectively. It will be further observed that this frequency is independent of speed of rotation of shaft 18 and the rotor parts 22 and 26.

The speed of rotation of the pilot rotor 20 is determined by the balance of accelerating and retarding torques to which it is subjected. Since the poles 34a to 34d and the poles 36a to 36d have a fixed relation to each other—and the effective poles produced by the winding 24 are of speed and position determined by the action of the poles 36a to 36d—the physical phase position of the poles effective in generating voltage in armature winding 12 is determined by the physical phase position of poles 34a to 34d. Consequently, the magnitude of the accelerating or driving torque on pilot rotor 20 is determined by the relative physical phase positions of the stator windings 12 and 9. For example, when the winding 9 is positioned so that the electrically produced rotating magnetic field due to the current flow in this winding is of the same physical phase position as the poles 34a to 34d, no power transfers across the air gap and the rotor 20 receives no driving power from this source. The rotor 20 will accordingly decelerate. On the other hand, if the physical position of the stator part 60 (and winding 9) is shifted to cause the phase position of the terminal voltage of winding 9 to define a rotating magnetic field leading the field of poles 34a to 34d, the pilot rotor 20 is subject to driving torque which will tend to accelerate this rotor. Steady state operation will take place at the frequency wherein the driving torque on rotor 20 equals the retarding torque.

The retarding torque on the pilot rotor 20 is believed to be from two principal sources. One is the windage and friction inherent in the rotation of the pilot rotor. The other is the electrical action between poles 36a to 36d and the winding 28. This action is much like the action of a D.-C. generator with the normal rotor and stator reversed. The electrical load consists mainly of the resistance loss in the windings 28 and 24. Since in the steady state the rotor 20 will revolve at a speed at which the drive torque is equal to the retarding torque, the effect of varying the drive torque—by shifting the stator 60 through the use of the handle 62a—is to control this speed. And, since the frequency of the induced voltage in stator winding 12 is determined by the speed of pilot rotor 20, the net effect of shifting stator 60 is to vary the output frequency.

If desired, the position of the stator 60 may be controlled automatically. This may be done, for example, by a frequency responsive apparatus, so that at any frequency setting the position of the stator 60 is altered to maintain the desired output frequency. Such mechanism may itself be manually controllable, so that the operator, by the use of a convenient manual control, may vary the frequency while the controller servers automatically to shift stator 60 as necessary to maintain the desired frequency.

Figure 4:
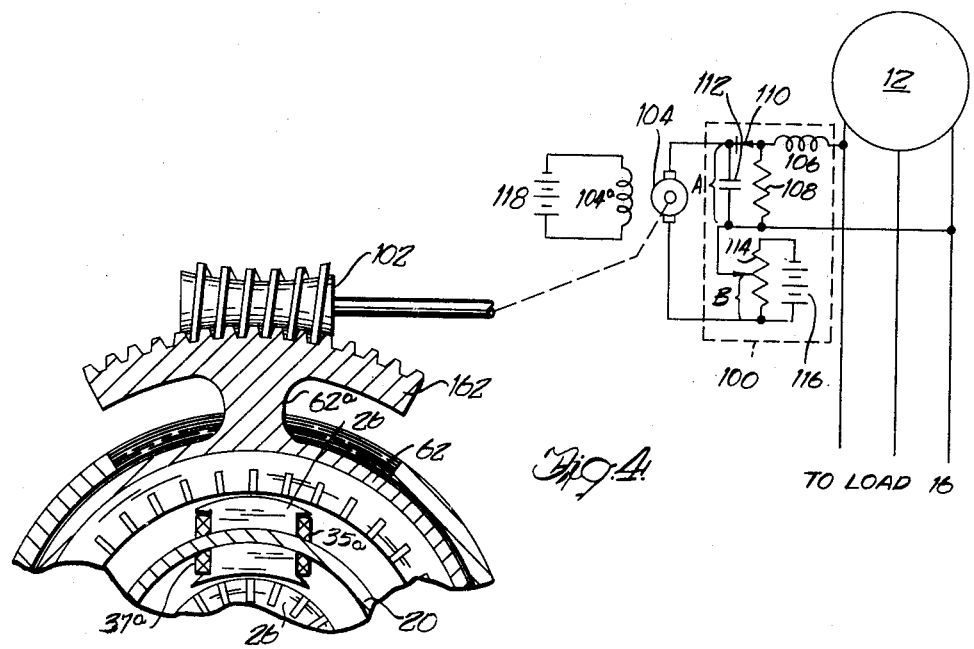
Fig. 4 is a fragmentary cross-sectional view like Fig. 3, showing in somewhat diagrammatic form an automatic control mechanism for frequency control.

Fig. 4 shows an automatic mechanism for controlling the generated frequency of the apparatus of Figs. 1–3. In the construction of Fig. 4, the arm 62a, Fig. 3, terminates in a sector rack 162, as shown in Fig. 4. This rack is engaged by the worm wheel 102 which is in turn driven by a drive motor 104 by mechanism described in detail hereafter. In brief, as the generated frequency rises above the preset value, the worm 102 is driven by motor 104 to rock the rack 162, and hence the rockable stator 62, in the direction to reduce the generated frequency—that is in the direction to bring the power angle of the stator 11 towards coincidence with the power angle of the stator winding 12. Conversely, if the generated frequency falls below the preset value, the worm 102 is driven by motor 104 to rock the rack 162, and hence the rockable stator 62, in the direction to increase the generated frequency—that is in the direction to increase the power angle between the stator 11 and the stator 12. The result is that the position of the stator 11 is automatically brought to the position for generating the preset frequency.

Motor 104 may be driven by any one of many frequency responsive networks well known in the art. For purposes of illustration, the network 100 consists of an inductance 106 and a resistance 108 connected in series across the terminals of one phase of the output of stator 12, Fig. 1. Because the current flow in this network decreases as frequency rises, the voltage across the resistance 108 becomes greater as the frequency falls. The rectifier 110 and the capacitor 112 are connected across the resistance 108, so that the rectified voltage appearing across the capacitor 112 increases as the frequency falls, and drops as the frequency increases. The motor 104, which is a D.-C. motor, is connected across the capacitor 112 and the potentiometer 114 as shown. The latter is energized by the battery 116, so that an adjustable voltage B appears across that portion of the potentiometer between the moving terminal and the end of the potentiometer. The field winding 104a of the motor 104 is connected across the battery 118 to provide a constant field current therefor.

In the circuit of Fig. 4 the motor 104 is energized by the difference between voltage A—determined by the action of rectifier 110 and hence decreasing as the frequency rises—and the voltage B—which is the voltage appearing across the potentiometer 114. When these two voltages are equal, the motor 104 receives no armature voltage and accordingly is not driven in one direction or the other. When voltage A exceeds voltage B—indicating that the frequency is below the set value—then the motor 104 is energized to rotate in one direction. This direction is such as to swing the sector rack 162—and hence the rockable stator 62—in the direction to increase the generated frequency. Conversely, when the voltage B exceeds voltage A—indicating that the frequency exceeds the set value—the opposite action occurs to swing the sector rack 162 in the direction to reduce the frequency.

It will be noted that the above system comes to a steady state when the voltages A and B are equal. Since the adjustment of the potentiometer 114 determines the value of the voltage B—and hence the value of voltage A at which steady state operation occurs—the potentiometer serves as a frequency setting element. Moreover, since the system acts automatically to provide a preset frequency of operation determined by the setting of the potentiometer and independent of the prime mover speed (within limits), the user need only vary the setting of the potentiometer to vary the frequency as desired.

It will be understood, of course, that the frequency sensitive network shown here is for illustrative purposes and that in actual practice modifications may be made to provide the requisite output power in the most economical fashion. Such modifications, for example, might include the use of a pilot motor of small power capacity to control the application of power to a larger motor driving the sector 162. Other arrangements well known to the art may be used to convert the voltage developed by the network 100 to mechanical power.

Figure 6:
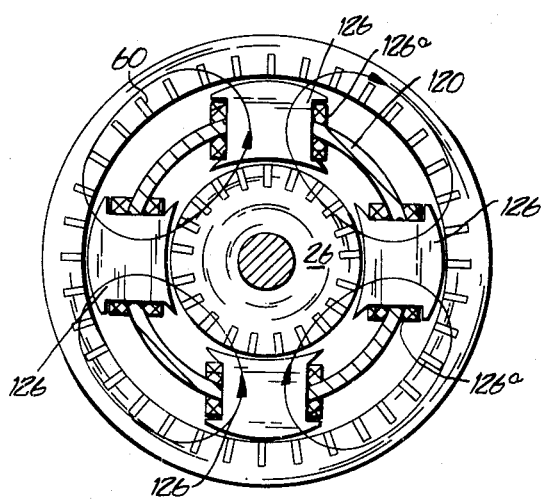
Fig. 6 is a view along axis 6—6, Fig. 5, on a somewhat smaller scale.
Figure 5:
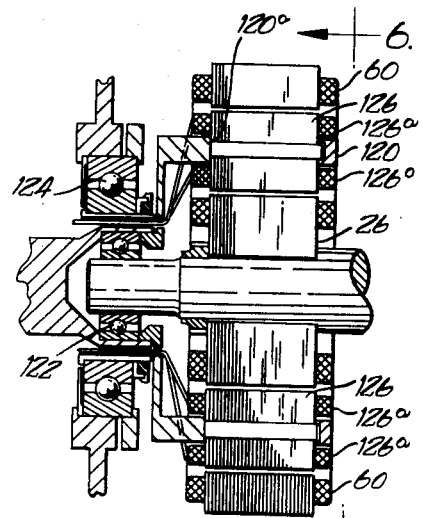
Fig. 5 is a fragmentary cross-sectional view like Fig. 1, but showing an alternative form of the pole pieces on the pilot rotor.

Figs. 5 and 6 show an alternative form of the pole structure of the pilot rotor. In these figures, the pilot rotor is indicated at 120 and is supported from the main shaft 18 by bearings 122 and 124. The pilot rotor defines an annular face 120a, to which the respective pole pieces 126 are attached. Each of these has a single winding 126a which—when energized—produces a magnetic field extending across the air gap to the armature 60, circumferentially about the armature, across the air gap from the armature 60 to the adjacent pole; through the adjacent pole and across the air gap from that pole to the auxiliary magnetic part 26 of the rotor, and circumferentially about the part 26 back towards the initial pole and across the air gap to that pole. These flux paths are shown by the arrows of Fig. 6. The net effect of this construction is to provide by the use of single poles the requisite magnetic field for synchronous motor action of the stator 60 in relation to pilot rotor 120 and D.-C. generator action between pilot rotor 120 and part 26 of the main rotor.

Action similar to that above described may be obtained with a construction similar to Fig. 1. However, if it is desired to do so, the sleeve or cylindrical part 20a of the rotor 20 may be made of sufficiently low reluctance in the circumferential direction to permit independent control of the fields in the armature 60 and the rotor part 26. For this action the inner and outer pilot rotor windings must be separately energized electrically.

Also, if desired, the generated voltage may be regulated by automatic means (not shown) to vary the setting of the resistance 48, Fig. 1, in response to A.-C. output voltage. Moreover, if desired, the windings 35a to 35d may be energized independently of windings 37a to 37d, thus permitting A.-C. output voltage control independent of the field by which rotor 20 rotates in synchronous rotor action.

It will be noted that the poles 36a to 36d coact with the auxiliary rotor 26 in generator action. Accordingly, the relative speed of rotation between the pilot rotor 20 and the main drive shaft 18 is important to the extent of defining the efficiency of the action of the flux of poles 20a to 20d in creating a like flux rotating within main stator 12. For this reason, there is some advantage in having the pilot rotor 20 rotate in a direction opposite to the rotation of shaft 18, for in this instance the percentage variation in relative speed of rotation between pilot rotor 20 and shaft 18 (for any given frequency range) is reduced. Thus, if the output frequency is to vary over a four to one ratio, the variation in relative speed between the shaft 18 and the pilot rotor 20 need be only in the ratio of $$\frac{2.25}{1.25}$$

or 1.8 to one.

While I have shown and described a specific embodiment of the present invention it will, of course, be understood that various modifications and alternative constructions may be made without departing from the true spirit and scope thereof. By way of example, but without limitation, the windings 24 and 28 may either or both be wave rather than lap windings, or they may have different numbers of poles, or the inner and outer poles of rotor 20 may be different. I therefore intend by the appended claims to cover all such modifications and alternative constructions as fall within the true spirit and scope thereof.

What is claimed is:

1. A generating system operable to produce alternating voltage of controlled frequency independent of prime mover speed, comprising in combination: a stator having a main polyphase armature winding and an auxiliary polyphase armature winding; a pilot rotor cooperable with the auxiliary winding and having means to create a magnetic field to provide driving torque from the auxiliary armature winding in synchronous motor action, the pilot rotor further defining an additional magnetic field which rotates in unison with the pilot rotor; a rotor driven by the prime mover and having an auxiliary magnetic part cooperable with the additional magnetic field of the pilot rotor and a main magnetic part cooperable with the main armature winding to generate voltage therein, the rotor further having windings linkings said magnetic parts respectively to produce in the main armature a magnetic field that rotates in unison with the pilot rotor; means connecting the armatures so that the pilot rotor is driven by the auxiliary armature with torque determined by the physical position of rotation of one armature in relation to the other; means responsive to the generated frequency to rotate one armature in relation to the other to increase the driving torque effective on the pilot rotor when the generated frequency falls; and adjustable means opposing said first means and operable to provide increased opposing force as said one armature moves in direction to increase torque on the pilot rotor.

2. A generating system operable to produce alternating voltage of controlled frequency independent of prime mover speed, comprising in combination: a stator having a main polyphase armature winding and an auxiliary polyphase armature winding; a pilot rotor cooperable with the auxiliary winding and having means responsive to the rotating magnetic field created by current flow in the auxiliary armature winding to cause the pilot rotor to tend to rotate therewith, the pilot rotor further defining an additional mangetic field which rotates in unison with the pilot rotor; a rotor driven by the prime mover and having an auxiliary magnetic part cooperable with the additional magnetic field of the pilot rotor and a main magnetic part cooperable with the main armature winding to generate voltage therein, the rotor further having windings linking the main magnetic part and the auxiliary magnetic part to produce in the main armature a magnetic field that rotates in unison with the pilot rotor; means connecting the armatures so that the pilot rotor is driven by current of frequency determined by its own speed of rotation; and means responsive to the generated frequency to vary the torque on the pilot rotor to increase the driving torque when the generated frequency falls.

3. A generating system operable to produce alternating voltage of controlled frequency independent of prime mover speed, comprising in combination: a stator having a main polyphase armature winding and an auxiliary polyphase armature winding; a pilot rotor cooperable with the auxiliary winding and having means responsive to the rotating magnetic field created by current flow in the auxiliary armature winding to cause the pilot rotor to tend to rotate therewith and defining an additional magnetic field which rotates in unison with the pilot rotor; a rotor driven by the prime mover and having an auxiliary magnetic part cooperable with the additional magnetic field of the pilot rotor and a main magnetic part cooperable with the main armature winding to generate voltage therein, the rotor further having windings linking the main magnetic part and the auxiliary magnetic part to produce in the main armature a magnetic field that rotates in unison with the pilot rotor; means connecting the armatures so that the pilot rotor is driven by current of frequency determined by its own speed of rotation; and means to adjust the torque effective on the pilot rotor to control the pilot rotor speed and hence output frequency.

4. A generating system operable to produce alternating voltage of controlled frequency independent of prime mover speed, comprising in combination: a stator having a pair of polyphase armature windings rotatably adjustable in relation to each other; a rotor having an axis of rotation and a pair of cylindrical magnetic parts complementary to and in axial alignment with the armature windings of the stator, each of said parts having longitudinal slots within which are disposed conductors defining a continuous circumferential winding, the conductors of each part being interconnected with each other and with the conductors of the other part to cause one of the magnetic parts to reproduce a magnetic field that rotates in relation to the other part; a pilot rotor interposed between one of said magnetic parts and the corresponding armature, the pilot rotor having outer poles cooperative with the corresponding armature to provide synchronous machine action and having inner poles cooperative with the corresponding magnetic part to induce current flow therein and in the other magnetic part to produce a magnetic field rotating within the other armature and thereby a generated voltage of frequency determined by the speed of rotation of the pilot rotor; and means responsive to the generated frequency to adjust the position of rotation of the said one armature in direction to increase the power angle between the stators as frequency decreases.

5. A generator operable to produce alternating voltage of frequency independent of prime mover speed, comprising in combination: a stator having a pair of polyphase armature windings; means to adjust manually the rotational position of one armature winding in relation to the other; a rotor driven by the prime mover having an axis of rotation and a pair of cylindrical magnetic parts complementary to and in axial alignment with the armature windings of the stator, each of said parts having longitudinal slots within which are disposed conductors defining a continuous circumferential winding, the conductors of each part being interconnected with each other and with the conductors of the other part to cause one of the magnetic parts to reproduce a magnetic field that rotates in relation to the other part; and a pilot rotor interposed between one of said magnetic parts and the corresponding armature, the pilot rotor having outer poles cooperative with the corresponding armature to provide synchronous machine action and having inner poles cooperative with the corresponding rotor part to induce current flow therein and in the other rotor part, thereby to produce a rotating magnetic field within the other armature and a generated voltage of frequency determined by the speed of rotation of the pilot rotor, the said speed being determined by the rotational position of one armature winding in relation to the other.

6. A generator operable to produce alternating voltage of frequency independent of prime mover speed, comprising in combination: a stator having a pair of polyphase armature windings rotatably adjustable in relation to each other; a rotor driven by the prime mover having an axis of rotation and a pair of cylindrical magnetic parts complementary to and in axial alignment with the armature windings of the stator, each of said parts having longitudinal slots within which are disposed conductors defining a continuous circumferential winding, the conductors of each part being interconnected with each other and with the conductors of the other part to cause one of the magnetic parts to reproduce a magnetic field that rotates in relation to the other part; and a pilot rotor interposed between one of said magnetic parts and the corresponding armature, the pilot rotor having one set of poles cooperative with the corresponding armature to provide synchronous machine action and having another set of poles cooperative with the corresponding magnetic part to induce current flow therein and in the other magnetic part thereby to produce a magnetic field rotating within the other armature and a generated voltage of frequency determined by the speed of rotation of the pilot rotor, the said speed being determined by the rotational position of one armature winding in relation to the other.

7. A generator operable to produce alternating voltage of frequency independent of prime mover speed, comprising in combination: a rotor driven by the prime mover and having cylindrical main and auxiliary magnetic parts in axially spaced position, each magnetic part having conductors defining a continuous circumferential winding, the conductors of each part being electrically connected to each other and to the conductors of the other part to develop a magnetic field in the main part which rotates in unison with a magnetic field linking the auxiliary part; a main polyphase armature encircling the main part of the rotor; an auxiliary polyphase armature electrically connected to the main armature and encircling the auxiliary rotor part with a substantial annular spacing; a pilot rotor having a plurality of magnetic poles located between the auxiliary armature and the auxiliary rotor part to define magnetic field paths through the poles, respectively, and through the auxiliary armature and the auxiliary rotor part; and windings encircling the poles to develop a magnetic flux in said paths.

8. A generator operable to produce alternating voltage of frequency independent of prime mover speed, comprising in combination: a rotor driven by the prime mover and having cylindrical main and auxiliary magnetic parts in axially spaced position, each magnetic part having conductors defining a continuous circumferential winding, the conductors of each part being electrically connected to each other and to the conductors of the other part to develop a magnetic field in the main part which rotates in unison with magnetic field linking the auxiliary part; a pilot rotor embracing the auxiliary part of the rotor and having a plurality of inwardly extending poles operable to produce flux linking the auxiliary part of the rotor, the pilot rotor further having outwardly extending poles; a main polyphase armature encircling the main part of the rotor; an auxiliary polyphase armature electrically connected to the main armature and encircling the outwardly extending poles of the pilot rotor; windings on the pilot rotor adapted to energize the inwardly extending and outwardly extending poles to produce flux therethrough, the said windings being interconnected so that direct current from a common source develops magnetic fields in the auxiliary and the auxiliary rotor part.

9. A generator operable to produce alternating voltage of frequency independent of prime mover speed, comprising in combination: a rotor driven by the prime mover and having cylindrical main and auxiliary magnetic parts, each magnetic part having conductors defining a continuous circumferential winding, the conductors of each part being interconnected so that a magnetic field rotating about the auxiliary part produces a magnetic field rotating in unison therewith about the main part; a main polyphase armature encircling the main magnetic part of the rotor to generate polyphase alternating currents of frequency determined by the speed of rotation of the field created by the main part of the rotor; a pilot rotor having parts defining a magnetic field linking the auxiliary part of the rotor to induce voltages in the winding thereof and a field in the main rotor rotating in unison therewith; an auxiliary polyphase armature electrically connected to the main polyphase armature; means on the pilot rotor defining magnetic poles cooperable with the auxiliary armature to drive the pilot rotor in synchronous machine action; and means to vary the power angle between voltages induced in the main and auxiliary armature windings to vary the driving torque on the pilot rotor and the frequency of the generated voltage.

10. A generating system operable to produce alternating voltage of controlled frequency independent of prime mover speed, comprising in combination: a stator having a main polyphase armature winding and an auxiliary polyphase armature winding; a pilot rotor cooperable with the auxiliary winding and having outwardly extending poles and energizing windings responsive to the rotating magnetic field created by current flow in the auxiliary armature winding to cause the pilot rotor to tend to rotate therewith and separate inwardly extending poles and energizing windings defining an additional magnetic field which rotates in unison with the pilot rotor; a rotor driven by the prime mover and having an auxiliary magnetic part cooperable with the additional field of the pilot rotor and a main magnetic part cooperable with the main armature winding to generate voltage therein, the rotor further having windings linking the main magnetic part and the auxiliary magnetic part to produce in the main armature a magnetic field that rotates in unison with the pilot rotor; means connecting the armatures so that the pilot rotor is driven by current of frequency determined by its own speed of rotation; and means to adjust the torque effective on the pilot rotor to control the pilot rotor speed and hence output frequency.

References Cited in the file of this patent

UNITED STATES PATENTS

| | | |
|---|---|---|
| 2,361,790 | Noxon | Oct. 3, 1944 |
| 2,581,093 | Gille | Jan. 1, 1952 |